US007028006B1

(12) United States Patent
Marsden et al.

(10) Patent No.: US 7,028,006 B1
(45) Date of Patent: Apr. 11, 2006

(54) PEER BASED DOCTRINE PERFORMANCE FRAMEWORK

(75) Inventors: Jeffrey Marsden, Toronto (CA);
Patrick Kennedy, Toronto (CA);
Douglas Trott, Toronto (CA)

(73) Assignee: PriceMetrix, Inc., Toronto (CA)

( * ) Notice: Subject to any disclaimer, the term of this patent is extended or adjusted under 35 U.S.C. 154(b) by 694 days.

(21) Appl. No.: 09/678,040

(22) Filed: Oct. 3, 2000

(51) Int. Cl.
*G06F 17/60* (2006.01)

(52) U.S. Cl. .......................................... 705/36; 705/35
(58) Field of Classification Search ................. 705/11, 705/35, 36, 37
See application file for complete search history.

(56) References Cited

U.S. PATENT DOCUMENTS

| 5,809,483 | A | | 9/1998 | Broka et al. | |
|---|---|---|---|---|---|
| 5,873,071 | A | | 2/1999 | Ferstenberg et al. | |
| 5,960,411 | A | | 9/1999 | Hartman et al. | |
| 6,275,814 | B1 | * | 8/2001 | Giansante et al. | 705/36 |
| 6,493,681 | B1 | * | 12/2002 | Tertitski et al. | 705/36 |
| 6,681,211 | B1 | * | 1/2004 | Gatto | 705/36 |

FOREIGN PATENT DOCUMENTS

JP      2003030448  A  *  1/2003

OTHER PUBLICATIONS

U.S. Provisional Appl. No. 60/082,868, filed Apr. 24, 1998.*
"Analyzing the Analysts", Information Week, Violino et al, Nov. 17, 1997, p 38.*

* cited by examiner

*Primary Examiner*—Vincent Millin
*Assistant Examiner*—Lalita M. Hamilton
(74) *Attorney, Agent, or Firm*—Jenkens & Gilchrist, a Professional Corp.

(57) ABSTRACT

A securities transaction performance framework for developing an evaluation system directed toward the securities industry. The framework comprises a compilation of Broker demographics, a compilation of Broker performance data, a compilation of Client Portfolio information, and a compilation of periodic Transaction data including volume of Transactions, commission charged, and associated Broker information. The data compilations interface with a Broker Master to correlate a Broker to a statistical database as requested by the user. The Broker Master correlates financial statistics from Transaction data to Broker demographics and performance data so as to provide a performance evaluation system. Transaction data is stored in a secure environment and is able to provide historical analysis upon request of the end user.

26 Claims, 4 Drawing Sheets

PEER BASED DOCTRINE PERFORMANCE FRAMEWORK

The field of the invention relates to a computer information system directed to the securities industry; more specifically the computer system is designed to focus on performance, evaluation, and management within the securities industry.

BACKGROUND OF THE INVENTION

The retail securities industry over the past several years has undergone radical changes, particularly with the advent of discount Brokerage and "on-line trading". Retail investors now have a plurality of options when selecting a desired method of investment execution and advice. The options range from self-directed on-line trading to, in the other extreme, investing through a retail "full service" Brokerage firm. The advent of Discount Brokerage and an increasingly sophisticated Client has caused individual full service Brokers to discount price for their services and Transactions frequently below the "list price" or calculated price of their employer. A full service Brokerage may involve physical interaction (in person) with a specific Broker and/or with an electronic agent ("E-agent"). E-agents, essentially a virtual broker, conduct electronic negotiations that lead to an intermediated exchange/trade. Often, Brokerage firms themselves, use a cross network intermediated exchange through an electronic intermediary in order to buy and/or sell a given amount of a given security at a given price. Further, in more complex forms, an exchange may have multiple participants.

As the size and complexity of commerce and investment has grown, participants have become less interested in single securities or lists of specific securities and are becoming more interested in expressing their investments as Portfolios of securities. In turn, the lists of securities and Portfolios become more and more detailed resulting in a greater need for a means of monitoring both securities performance and Broker performance.

There is a growing need amongst the securities industry to implement a performance evaluation framework such that Brokers and salespeople can monitor their own personal performance and the firm, in turn, can monitor the performance of individual Brokers, individual Clients, and a plurality of other variables. These variables include branches, colleagues, regions, products, securities types, and the like. The industry lacks meaningful comparative evaluations other than gross production, commissions earned, and revenues. There is no central exchange where information relating to individual and company participants in the securities industry is pooled, transformed, and made available in order to improve the efficiency of pricing and client management.

It is an object of the present invention to obviate and/or mitigate at least some of the above mentioned difficulties.

SUMMARY OF THE INVENTION

This invention provides a securities Transaction framework for developing an evaluation system directed toward the securities industry. The invention is intended to be a tool to aid full service retail securities Brokerage firms and their advisors to both manage and improve the pricing of their services and the management of their clients. The present invention provides a performance evaluation framework for measuring discretionary price behaviour for securities Brokers. The securities Transaction performance framework, in the preferred implementation will comprise a compilation of broker demographics, a compilation of Broker performance data, a compilation of Client Portfolio information, and a compilation of periodic Transaction data including the volume of Transactions, commissions charged and related Broker information. Transaction data will be stored in a secure environment and is able to provide historical analysis upon request of the end user.

In the preferred embodiment, a Broker Master compiles Broker demographics and Broker performance data, interfaces this data with both the Client and Transaction data, and generates statistical data as requested by the user providing a means for self evaluation of each Broker. The system is designed such that the user may query the system and the system will return a data table containing the requested financial statistics. The system is used by individual Brokers to monitor their performance as compared to peers, other framework participants, and the industry as a whole. In turn, the system may also be used to monitor Client and firm performance in the securities industry.

Preferably, a set of criteria is generally applied to the Broker data in order to correlate and rank individual. Brokers according to the number of Transactions per period and number of months licensed so as to produce a resultant ranking which is then allocated by a peer group. These peer groups are based on length of service in the industry, or experience, and correlate the financial statistics from Transaction data to specific peer groups so as to rank each Broker performance within a peer group. Further, each Client is assigned a Client attractiveness value (CAV) which is based primarily on the total number of assets in all accounts.

In the preferred embodiment, the framework provides at least three sets of pricing information. Data tables generate list prices for particular services of both discount brokerage and full service brokerage firms, comparisons amongst market prices and price ranges of specific firms, comparisons for individual Brokers of price charged and number of months experience in the industry, etc.

The larger the number of participants in the securities industry, the greater the need for pricing efficiency. Exchanges allow participants to get the best price from many sellers when buying, and to get the best price from many buyers when selling. The transaction framework allows the sellers of securities, execution services, and advice to determine their price by comparing that price with, the price of other sellers that have sold similar services; and to the price of other buyers that have purchased similar services. This framework further facilitates the direct comparison of their price to the price of individual discount Brokerage firms.

In accordance with one aspect of the present invention there is provided a method for providing a securities Transaction performance framework corresponding to a plurality of data files, the files being stored it, a central repository, and each of the files being associated with an associated Broker or a Client, the method comprising the steps of:
 a) Creating a plurality of Master files containing Broker demographics, Broker performance, Client information, and periodic Transaction information.
 b) Assigning a value for the number of Transactions per period to be equated with a normal Portfolio type and, a value for the number of Transactions per period to be associated with an active trading Portfolio type.
 c) Assigning a ranking to each Broker based on the number of months licensed and correlating the Broker rank and the Portfolio type to develop a series of peer groups based on a specific range of months licensed and a respective trading Portfolio type.

d) Assigning a Client attractiveness value (CAV) ranking for each Client. The CAV is representative of the value of assets in all accounts. CAVs are ranked on the basis Fat an asset value is equivalent or greater than a particular threshold value, and in turn, is assigned a specific ranking.

e) Creating a Transaction Master file comprising statistical data for each Client with regard to the number of Transactions, commissions charged, etc. and, for each Broker, the principal number of units traded, commissions charged, etc.

Using the compiled data from the aforementioned method, a number of statistical and financial data tables may be generated depending on the desired information of the end user. The data may include both U.S. and Canadian securities information and Transaction activity, with will be updated on a regular basis. The data may be uploaded, from each firm, then reformatted, and analyzed so as to provide price market data in a user-friendly format.

The transaction framework provides a means of comparing variables having like characteristics. It allows for the evaluation of best/worst practices between comparable entities, comparable entities being like variables. The transaction framework further provides a central exchange where information is co-mingled. While the stock market provides current and up-to-date transaction information as it relates to the price of a security, the transaction framework provides real time pricing of a transaction as it relates to a specific customer as opposed to the price of a security. This particular element introduces transparency to the framework such that it provides an illustration of the trading/exchanges within the market to framework participants. The element of transparency enables brokers to evaluate the price of like commodities sold by themselves as well as their competitors and increase pricing efficiency.

BRIEF DESCRIPTION OF THE DRAWINGS

These and other features of the preferred embodiments of the invention will become more apparent in the following detailed description in which reference is made to the appended drawings wherein.

Prior to the detailed description of the preferred embodiments, the following list of terms will be used herein, these terms; are said to have following meaning:

Broker: refers to a financial consultant or investment executive in the securities field, a Broker may be a physical person or an electronic agent, and may be licensed or work as an assistant for a licensed Broker;

Client: refers to a person using the services of a Broker, or maintaining an account with a Brokerage firm;

Transaction: is any exchange of information, currency exchange, opening/closing of an account, buying, selling, assigning or exercising of a security, etc; and Portfolio: refers to a plurality of commodities that may be invested in, or held by a Client in a single instance.

Master refers to a general table for storing and manipulating, Broker, Transaction and Client data.

P.P. ratio: refers to Price to Principal ratio, which is equal to the price charged, in whatever form, commission, fee, or spread, divided by the principal value of the transaction P.R. ratio: refers to Price Realization, which ratio is equal to the scheduled price or commission less the discount or plus a premium, divided by the scheduled price or commission.

DESCRIPTION OF THE PREFERRED EMBODIMENTS

Figure 1:
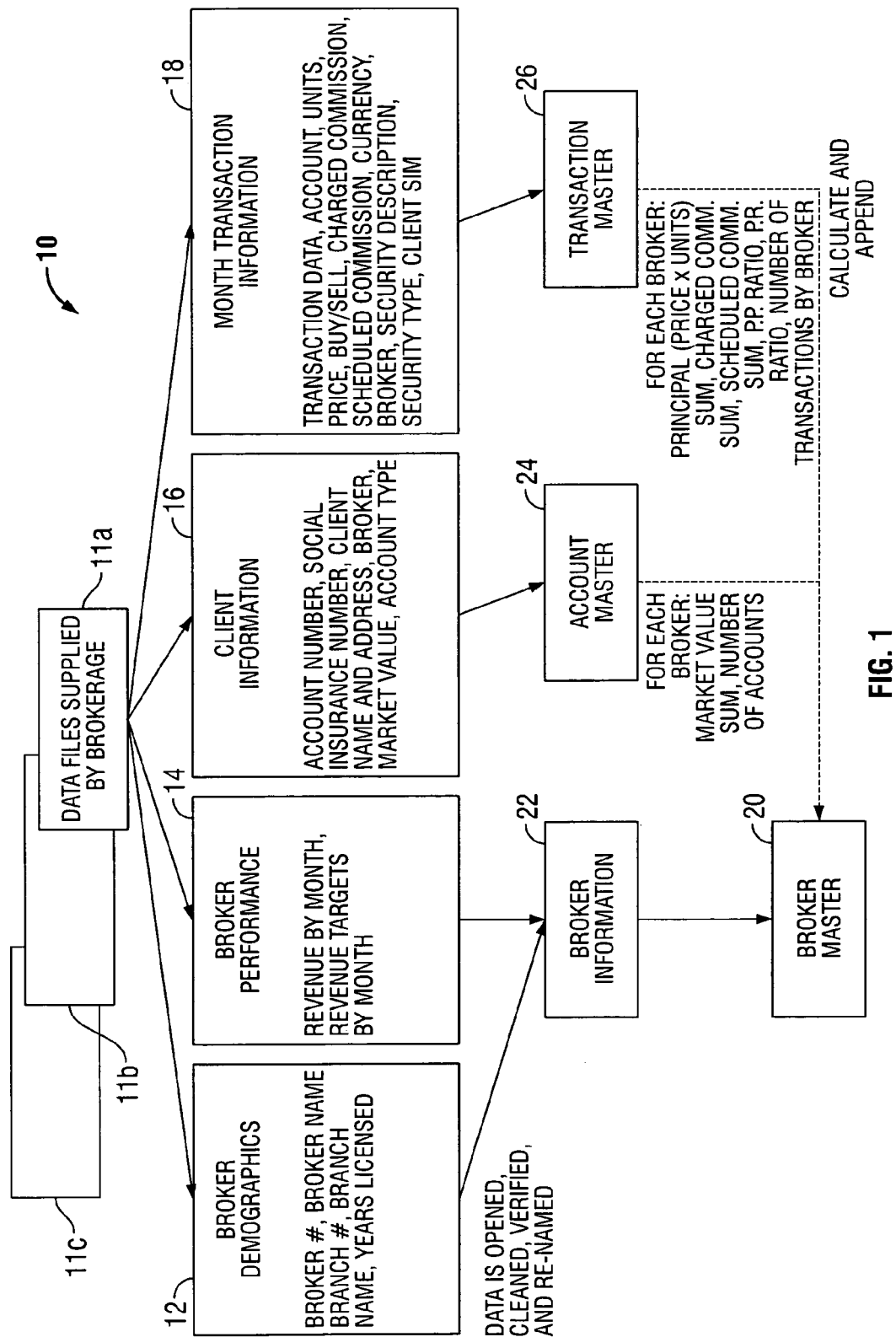
FIG. 1 is a functional block diagram detailing a securities Transaction performance framework for the development of an evaluation system.

FIG. 1, a performance framework within a programmed computer system 10 receives data from a plurality of Brokerages, 11a, 11b, 11c . . . and directs it to a set of Master files containing Broker demographics 12, Broker performance 14, Client information 16, and periodic Transaction information 18. Each set of Master files 12 through 18 has at least one interface to a Broker Master 20. The Broker Master 20 then correlates the information contained within these Master files 12 through 18 in order to generate statistical data as requested by the user. Information from Master files may be amalgamated into sub sets of data, as indicated by Broker information 22 which results from correlating Broker demographics 12 with Broker performance 14, as shown more fully in FIG. 2. The data in Client information 16 is opened, cleaned, verified and reorganized into an account Master 24. Similarly, periodic Transaction information 18 is also opened, cleaned, verified and reorganized and becomes a Transaction Master 26. The identity of the source of the information is encrypted to ensure anonymity. The Broker Master 20 provides a computational engine to correlate financial statistics from the periodic Transaction information 18 and to link this information to specific Broker demographics, Clients, and performance, for evaluation.

Broker demographics 12 typically comprise information such as Broker numbers, Broker names, associated branches, the number of months licensed, etc. whereas Broker performance 14 typically includes periodic revenues of each Broker, the Broker targets, differentials between actual revenue and target revenue, etc. To facilitate the evaluation, the Broker Master 20 establishes nominal delineations and associated criteria. The resultant peer groups 1 through 8, and shown on FIG. 2 as numbers 41 through 48, serve as a mechanism to evaluate Broker performance.

Figure 2:
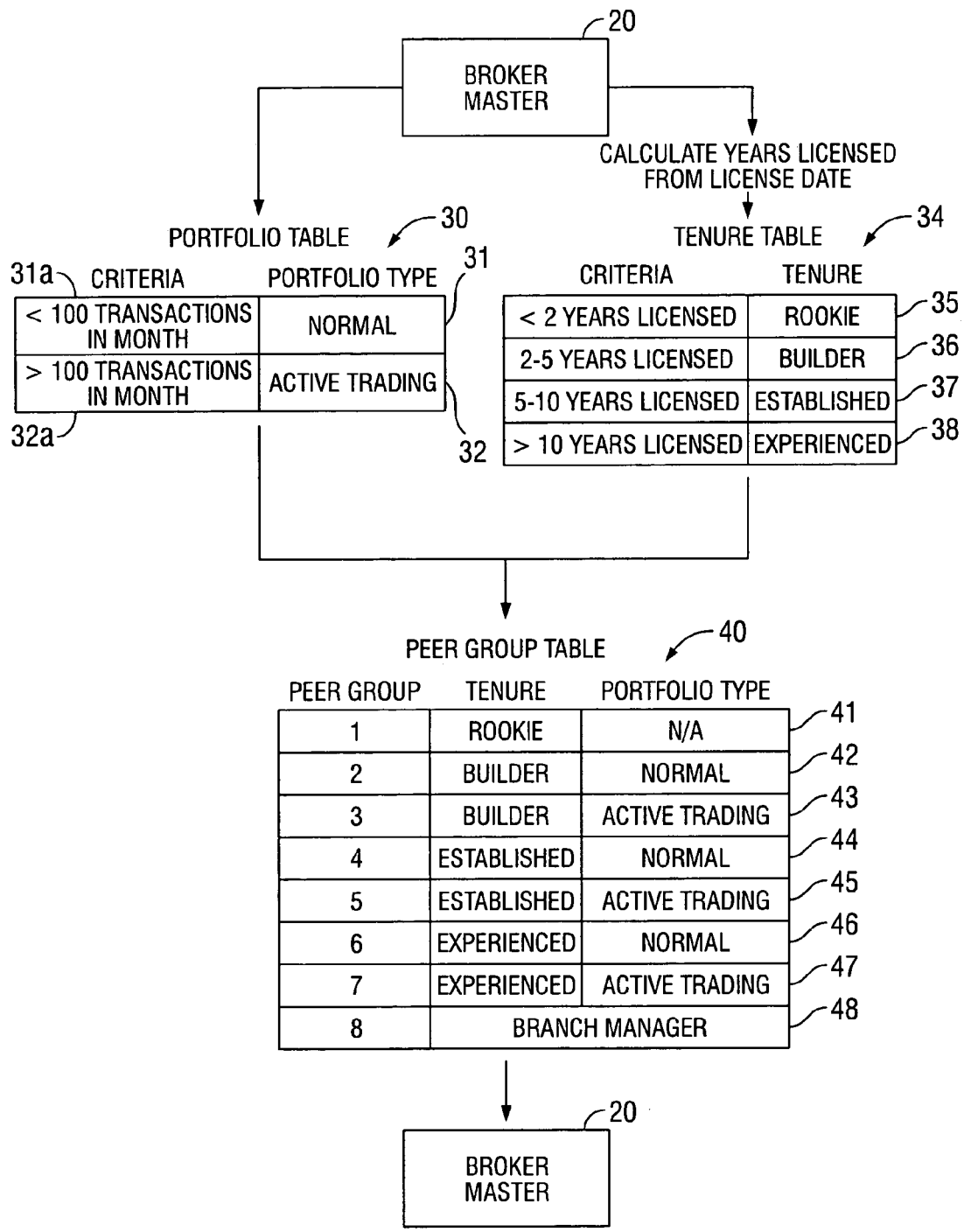
FIG. 2 is a functional block diagram detailing the communication hierarchy and interaction of the Broker Master of FIG. 1.

In the example shown in FIG. 2 the Broker Master 20 establishes a Portfolio table 30 which designates Portfolios into two types, namely a Normal type 31 with less than 100 Transactions per period and an Active Trading type 32 for 100 or more Transactions per period. Criteria 31a, 32a respectively which can be obtained primarily from the Broker Master 20 are assigned to each type.

Similarly, the Broker Master 20 establishes designations of Brokers based on the months of licensing, indicated as a Tenure table 34, which is information primarily retained in the Broker demographics 12. In the example of FIG. 2, designations, "rookie", 35, "builder", 36, "established", 37 and "experienced", 38 are provided and different lengths of service accorded to each.

The Broker Master 20 utilizes the two sets of designations to establish a peer group table 40 with eight peer groups, 41–48 respectively. The peer groups 41–48 combine the designations of the tenure table 34 and Portfolio table 30 so that each peer group has a distinctive set of criteria applied.

Figure 3:
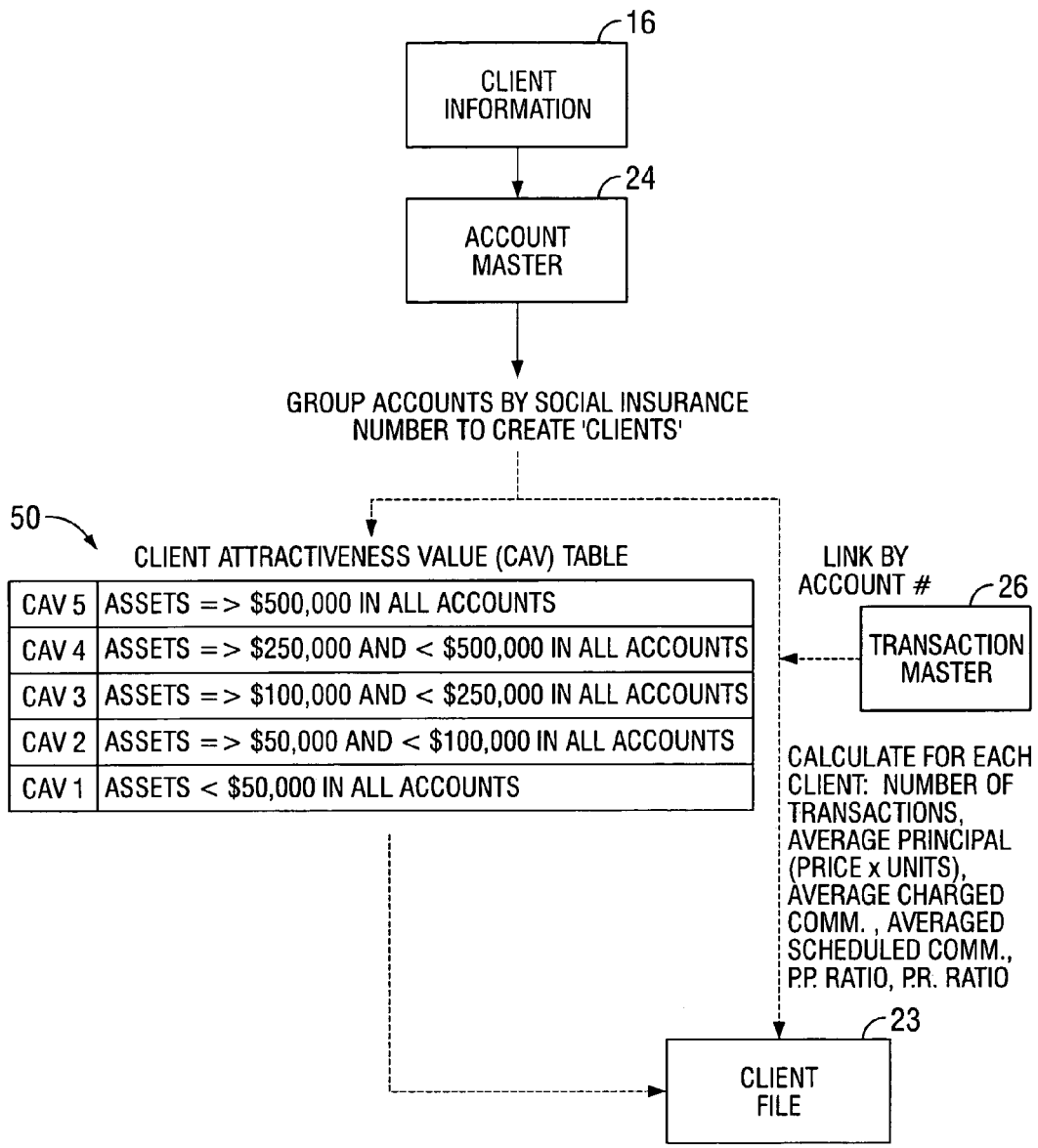
FIG. 3 is a functional block diagram detailing the interaction of the account Master of FIG. 1.
Figure 4:
FIG. 4 is a schematic diagram of resultant information produced by the Broker Master.

Referring to FIG. 3, the account Master 24 utilizes the information in the Client information Master 16 to accord a Client attractiveness value (CAV) 50 designation to each Client. The Client attractiveness value (CAV) 50 is ranked according to the total assets in each investment account. For example, a Client attractiveness value (CAV) 50 given a ranking 5 is associated with a total asset value of $500,000.00 or greater. The account Master 24 utilizes information in the Client information 16, such as a social insurance number (SIN) to group different accounts each of which has its own account number to the same Client when calculating the CAV 50. The account Master 24 is linked by the assigned account number to the Transaction Master 26 and therefore is able to correlate the CAV 50, Transaction data, and the Client within a Client file database 23. The Transaction Master 26 contains information which is classified according to each account and includes the number of Transactions per period, average principal in the account, average commissions charged to that Client, the average scheduled commission, the P.P. ratio and P.R. ratio.

The interactions of the Broker Master 20 with the client master 23 enables initial reports to be prepared. The Broker Master 20 accesses the account Master 24 to ascertain the market value of Clients for which the Broker is responsible and the number of accounts under his control.

Similarly, the Broker Master 20 obtains from the Transaction Master 26 for each Broker, the principal, charged commission scheduled commission, the P.P. ratio; P.R. ratio and number of Transactions completed.

The Broker Master 20 may then rank the Brokers by the P.R. ratio or may subdivide the Brokers into the peer group designations and assign a rank within each peer group. A simple ranking of performance of an individual Broker may then be obtained.

Figure 5:
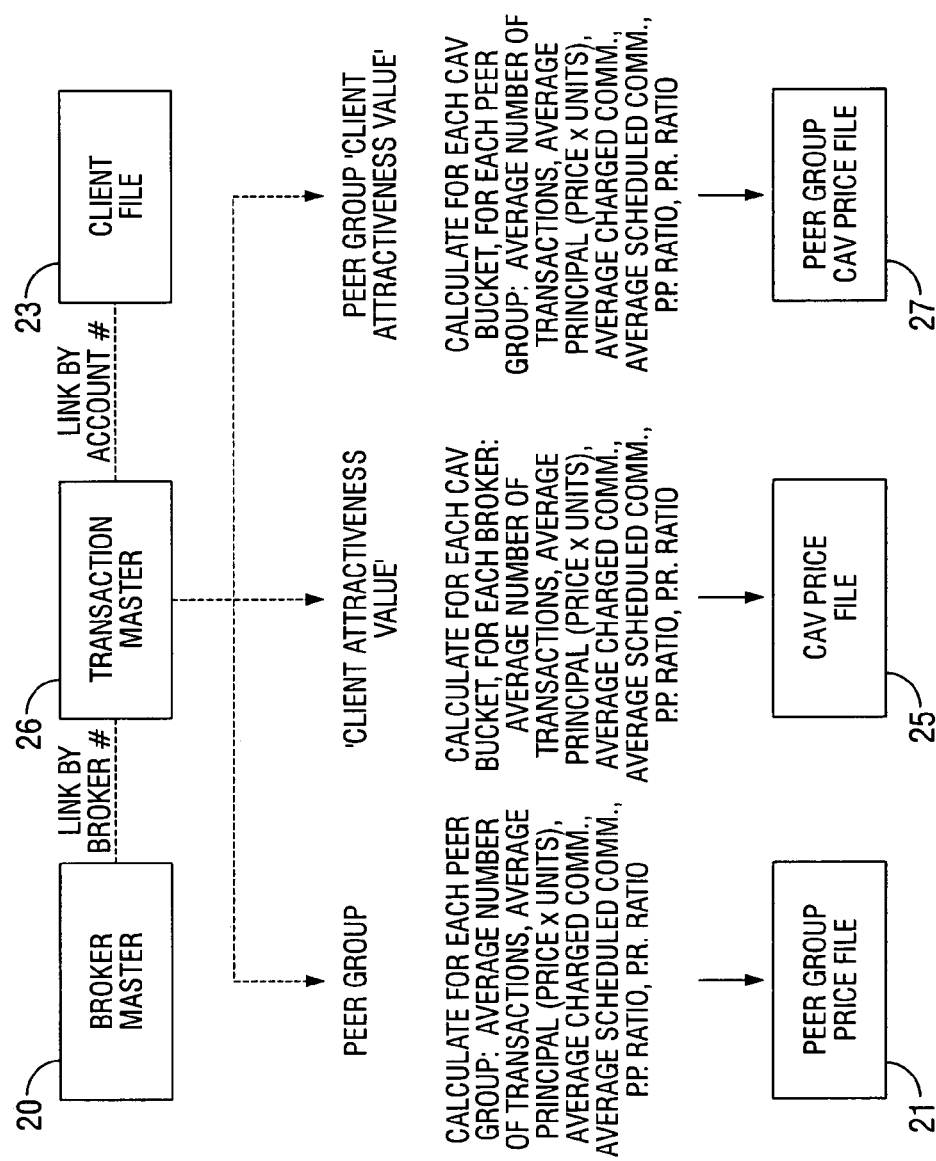
FIG. 5 is a schematic of the securities Transaction framework for developing an evaluation system.

The correlation of information in each of the Master files, 12 through 18, through the Broker Master 20 also enables a number of different reports to be provided as illustrated in FIG. 5.

By utilizing the peer group designations, a peer group price file 21 may be generated which provides averages of performance within each peer group. Thus average data on the number of Transactions, principal, commissions, both charged and scheduled, P.P. ratio and P.R. ratio can be prepared. The performance of an individual Broker may then be compared on the average data used to establish targets.

Alternatively, the CAV 50 accorded to each Client in Client file 23 may be utilized to establish average values for performance within each CAV 50 designation. Performance based on CAV 50 may be evaluated for each broker, generating a CAV price file 25. Performance may also be compared between brokers in a peer group, generating a Peer Group CAV price file 27.

The subdivision of performance data within the peer group and CAV 50 designations further facilitates the establishment of evaluation criteria by allowing the organization of information by CAV 50 designation and for each peer group. Thus the performance of, for example, an experienced Broker with a Client having assets in a particular value range may be obtained.

Of particular interest in the reports are the realized commissions that are attained for different designations of Client. The commissions charged are, to a certain extent, discretionary. The collection of information from multiple sources and its organization by CAV 50 designation permits a Broker to ascertain the range of commissions that are attainable within that group and the pricing of their services relative to others in their branch, region, firm, and framework participants.

The data contained within the Master files, 12 through 18, may be updated on a regular basis, such that the data remains current. The data may also lend itself to both the US and Canadian securities information. The framework (embodied in the programmed computer system 10) in its preferred embodiment is intended to be a real-time based tool for measuring the discretionary price behaviour for security Brokers. The programmed computer system 10 is designed in order to facilitate the smooth running of a firm within a securities business. The programmed computer system 10 is used to segment a business into desired categories, focus on specific Clients, tracking of assets and accounts, measurement of revenue growth, and serve as a comparison tool for Clients, firms and the like. The end tables generated may be used in periodic management reports, firm periodic reports, or by individual Brokers.

Although the invention has been described with reference to certain specific embodiments, various modifications thereof will be apparent to those skilled in the art without departing from the spirit and scope of the invention as outlined in the claims appended hereto.

What is claimed is:

1. A comparative price performance framework for allowing comparison of price performance among a plurality of brokers over a given time period, comprising:
   at least one database, comprising for each broker:
      a first set of data linking the broker with a plurality of clients, including transactions performed by the broker for each client during the time period, and the price charged by the broker for each said transaction; and
      a second set of data comprising each broker's experience and transaction volume;
   a software means in communication with the database for sorting the brokers and their respective first sets of data into a plurality of peer groups, the peer groups being based on pre-determined ranges of broker experience and transaction volume, as determined from each broker's second set of data; and
   an interface in communication with the software means for displaying, for a selected broker:
      price statistics for the broker's transactions during the time period; and
      comparative price statistics for the transactions of brokers within the same peer group as the selected broker;
      wherein the price charged by the broker for each transaction represents the broker's commission and the price statistics and the comparative price statistics are statistics on the broker's commissions.

2. The framework of claim 1, wherein:
   each broker's first set of data further comprises, for each client, data comprising total assets managed for the client; and
   the software means further comprises means for sorting each broker's clients into a plurality of client attractiveness value (CAV) groups, the CAV groups being based on pre-determined ranges of total assets; and
   the interface is further capable of displaying, for a selected broker:

price statistics for the broker's transactions during the time period sorted by CAV group; and comparative price statistics for the transactions of other brokers sorted by CAV group.

3. The framework of claim 2, wherein the other brokers comprise brokers from the selected broker's peer group.

4. The framework of claim 1, wherein the price statistics and the comparative price statistics comprise at least one statistic from the group consisting of: total revenues, average price per transaction, price realization ratio, and price to principal ratio.

5. The framework of claim 1, wherein the brokers comprise securities brokers.

6. The framework of claim 1, wherein the interface is further capable of displaying, for a selected peer group and selected price statistic, a rank list of brokers within that peer group ordered according to said selected price statistic.

7. The framework of claim 6, wherein the database further comprises at least one target value for a price statistic and the interface is further capable of displaying one or more actual values of a selected price statistic concurrently with the target value for the selected price statistic to permit comparison.

8. The framework of claim 7, wherein the target value is linked to a broker in the database.

9. A comparative price performance framework for allowing comparison of price performance among a plurality of brokers over a given time period, comprising:
  at least one database, comprising for each broker:
    a set of data linking the broker with a plurality of clients, including transactions performed by the broker for each client during the time period, total assets managed for each client, and price charged by the broker for each said transaction; and
  a software means in communication with the database for sorting the clients for each broker into a plurality of client attractiveness value (CAV) groups, the CAV groups being based on pre-determined ranges of total assets; and
  an interface in communication with the software means for displaying, for a selected broker:
    price statistics for the broker's transactions during the time period sorted by CAV group; and
    comparative price statistics for the transactions of other brokers sorted by CAV group;
  wherein the price charged by the broker for each transaction represents the broker's commission and the price statistics and the comparative price statistics are statistics on the broker's commissions.

10. The framework of claim 9, wherein the price statistics and the comparative price statistics comprise at least one statistic from the group consisting of: total revenues, average price per transaction, price realization ratio, and price to principal ratio.

11. The framework of claim 9, wherein the brokers comprise securities brokers.

12. The framework of claim 9, wherein the database comprises one or more firms of brokers.

13. The framework of claim 12, wherein the interface is further capable of displaying, for a selected broker, comparative price statistics for the transactions of brokers within the same firm as the selected broker.

14. The framework of claim 12, wherein the interface is further capable of displaying, for a selected firm and selected price statistic, a rank list of brokers within the selected firm ordered according to said selected price statistic.

15. The framework of claim 12, wherein the database further comprises at least one target value for a price statistic and the interface is further capable of displaying one or more actual values of a selected price statistic concurrently with the target value for the selected price statistic to permit comparison.

16. The framework of claim 15, wherein the target value is linked to a broker in the database.

17. The framework of claim 15, wherein the target value is linked to a firm in the database.

18. A comparative price performance framework for allowing comparison of price performance among a plurality of brokers over a given time period, comprising:
  at least one database, comprising for each broker:
    a set of data linking the broker with a plurality of transactions performed by the broker during the time period, type of each said transaction, principal value of each said transaction, and price charged by the broker for each said transaction; and
  a software means in communication with the database for sorting the transactions for each broker into pre-determined transaction groups based on one or both of the following criteria:
    the type of the transaction; and
    the principal value of the transaction;
  an interface in communication with the software means for displaying, for a selected broker:
    price statistics for the broker's transactions during the time period sorted by transaction group; and
    comparative price statistics during the time period of other brokers sorted by transaction group;
  wherein the price charged by the broker for each transaction represents the broker's commission and the price statistics and the comparative price statistics are statistics on the broker's commissions.

19. The framework of claim 18, wherein the price statistics and the comparative price statistics comprise at least one statistic from the group consisting of: total revenues, average price per transaction, price realization ratio, and price to principal ratio.

20. The framework of claim 18, wherein the brokers comprise securities brokers.

21. The framework of claim 18, wherein the database comprises one or more firms of brokers.

22. The framework of claim 21, wherein the interface is further capable of displaying, for a selected broker, comparative price statistics for the transactions of brokers within the same firm as the selected broker.

23. The framework of claim 21, wherein the interface is further capable of displaying, for a selected firm and selected price statistic, a rank list of brokers within the selected firm ordered according to said selected price statistic.

24. The framework of claim 21, wherein the database further comprises at least one target value for a price statistic and the interface is further capable of displaying one or more actual values of a selected price statistic concurrently with the target value for the selected price statistic to permit comparison.

25. The framework of claim 24, wherein the target value is linked to a broker in the database.

26. The framework of claim 24, wherein the target value is linked to a firm in the database.

* * * * *